(12) United States Patent
Shibata et al.

(10) Patent No.: US 9,057,819 B2
(45) Date of Patent: Jun. 16, 2015

(54) LIGHT-EMITTING ELEMENT DRIVING APPARATUS, CONTROL METHOD OF THE SAME, OPTICAL ENCODER, AND CAMERA

(71) Applicant: CANON KABUSHIKI KAISHA, Tokyo (JP)

(72) Inventors: Masanori Shibata, Inagi (JP); Yoshikazu Yamazaki, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 14/190,842

(22) Filed: Feb. 26, 2014

(65) Prior Publication Data

US 2014/0255017 A1  Sep. 11, 2014

(30) Foreign Application Priority Data

Mar. 5, 2013  (JP) ................. 2013-043420

(51) Int. Cl.
*G09G 3/32* (2006.01)
*G02B 7/04* (2006.01)
*G01D 5/34* (2006.01)

(52) U.S. Cl.
CPC ... *G02B 7/04* (2013.01); *G01D 5/34* (2013.01)

(58) Field of Classification Search
USPC ............. 345/76, 77, 80, 81, 82, 83, 204, 207, 345/211
See application file for complete search history.

(56) References Cited

U.S. PATENT DOCUMENTS

| | | | |
|---|---|---|---|
| 5,299,170 A | 3/1994 | Shibata et al. | |
| 5,350,269 A | 9/1994 | Azuma et al. | |
| 5,903,246 A * | 5/1999 | Dingwall | 345/82 |
| 6,392,617 B1 * | 5/2002 | Gleason | 345/82 |
| 7,079,094 B2 * | 7/2006 | Tokioka et al. | 345/82 |
| 7,521,971 B2 | 4/2009 | Yamazaki | |
| 7,906,998 B2 | 3/2011 | Yamazaki | |
| 8,085,098 B2 | 12/2011 | Yamazaki | |
| 8,334,713 B2 | 12/2012 | Yamazaki | |
| 8,456,231 B2 | 6/2013 | Yamazaki | |
| 8,531,239 B2 | 9/2013 | Yamazaki | |
| 2013/0009933 A1 * | 1/2013 | Toyomura et al. | 345/211 |
| 2013/0119244 A1 | 5/2013 | Shibata et al. | |
| 2014/0104001 A1 | 4/2014 | Yamazaki | |

FOREIGN PATENT DOCUMENTS

| | | |
|---|---|---|
| JP | 09-045980 A | 2/1997 |
| JP | 2001-244556 A | 9/2001 |
| JP | 2004-288868 A | 10/2004 |

OTHER PUBLICATIONS

U.S. Appl. No. 14/262,035, filed by Yoshikazu Yamazaki on Apr. 25, 2014.

* cited by examiner

*Primary Examiner* — Tung X Le
(74) *Attorney, Agent, or Firm* — Fitzpatrick, Cella, Harper & Scinto

(57) ABSTRACT

A light-emitting element driving apparatus comprising a light-emitting element, a driving unit including a control terminal for driving the light-emitting element based on a potential of the control terminal, and a controlling unit including a voltage holding unit, wherein the controlling unit controls the potential of the control terminal such that an emitted light amount approaches a target value and causes the voltage holding unit to hold a voltage corresponding to the potential of the control terminal, when the light-emitting element is in an emitting state, controls the potential of the control terminal to inactivate the driving unit, when setting the light-emitting element in a non-emitting state, and controls the potential of the control terminal by using the voltage of the voltage holding unit, when setting the light-emitting element in the emitting state again.

10 Claims, 7 Drawing Sheets

LIGHT-EMITTING ELEMENT DRIVING APPARATUS, CONTROL METHOD OF THE SAME, OPTICAL ENCODER, AND CAMERA

BACKGROUND OF THE INVENTION

1. Field of the Invention

The present invention relates to a light-emitting element driving apparatus, a control method of the same, an optical encoder, and a camera.

2. Description of the Related Art

In an application such as an optical encoder, a light-emitting element used as a light source can be driven by APC (Auto Power Control) so as to hold the emitted light amount constant. As an example of an apparatus capable of this APC operation, a light-emitting element driving apparatus that monitors the emitted light amount of the light-emitting element and controls the driving of the light-emitting element so that the emitted light amount approaches a target value is known.

Japanese Patent Laid-Open No. 2001-244556 has disclosed a technique pertaining to the APC operation of a laser diode driving circuit. More specifically, a monitor signal Vm as a monitoring result of the emitted light amount of a light-emitting element 107 is input to the input terminal of a comparator 101, and the APC operation is performed based on the result of comparison performed on the monitor signal Vm and a reference voltage Vref1 by the comparator 101. Also, an amplifier circuit 110 is connected to the input terminal of the comparator 101 via a switch 111, and a signal of the amplifier circuit 110 is output to the input terminal by turning on the switch 111 before the APC operation is started. This method shortens the time elapsed before the emitted light amount of the light-emitting element stabilizes. However, the performance of the amplifier circuit 110 determines the time elapsed until this stabilization.

To increase the speed of the APC operation by shortening the activation time of the light-emitting element driving apparatus, the potential of a node for controlling the driving of the light-emitting element must be controlled within a short time period. For example, when reactivating an optical encoder after it is paused, the light-emitting element must return to the emitted light amount in an emitting state as a target value within a short time period. A possible practical example is a case in which, in order to acquire a difference between a signal component obtained by the optical encoder and the offset component of the apparatus, the offset component is acquired by setting the light-emitting element having emitted light in a non-emitting state, and then the light-emitting element is returned to the previous emitting state.

According to Japanese Patent Laid-Open No. 2001-244556, however, a predetermined signal determined by the amplifier circuit 110 as an external circuit is input to the comparator 101, and no signal corresponding to the emitting state of the light-emitting element is generated. Therefore, for example, it is difficult to perform control corresponding to characteristics resulting from the production tolerance and unique to the apparatus. Accordingly, the emitted light amount of the light-emitting element cannot return to the emitted light amount in an emitting state immediately preceding a non-emitting state within a short time period.

SUMMARY OF THE INVENTION

It is an object of the present invention to provide a technique advantageous in returning a light-emitting element changed from an emitting state to a non-emitting state to the previous emitting state.

One of the aspects of the present invention provides a light-emitting element driving apparatus, comprising a light-emitting element, a driving unit including a control terminal and configured to drive the light-emitting element in accordance with a potential of the control terminal, and a controlling unit including a voltage holding unit, wherein the controlling unit controls the potential of the control terminal such that an emitted light amount approaches a target value, and causes the voltage holding unit to hold a voltage corresponding to the potential of the control terminal, when the light-emitting element is in an emitting state, controls the potential of the control terminal to inactivate the driving unit, when setting the light-emitting element in a non-emitting state, and controls the potential of the control terminal by using the voltage held in the voltage holding unit, when setting the light-emitting element in the emitting state from the non-emitting state.

Further features of the present invention will become apparent from the following description of exemplary embodiments with reference to the attached drawings.

DESCRIPTION OF THE EMBODIMENTS

Figure 1:
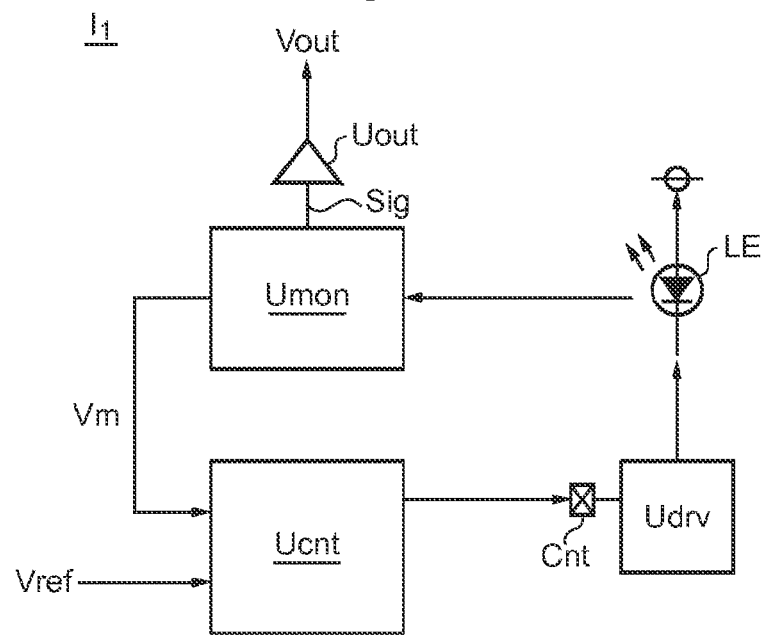
FIG. 1 is a block diagram for explaining a configuration example of a light-emitting element control apparatus according to the present invention.

Before the explanation of each embodiment according to the present invention, a configuration example of an optical encoder 100 will be explained below with reference to a schematic view of FIG. 8. The optical encoder 100 includes, for example, a controlling unit Ucnt for controlling a driving unit Udrv, the driving unit Udrv for driving a light-emitting element LE (a light source), a reflective optical scale 120, and a line sensor 130. The reflective optical scale 120 reflects emitted light L1 from the light-emitting element LE. The line sensor 130 is a sensor unit for sensing reflected light L2 from the reflective optical scale 120, and can be formed by a light-receiving element. An electric current output from the line sensor 130 having sensed the reflected light L2 is converted into a voltage by, for example, an I/V conversion circuit 140, and a signal Sig is obtained.

The signal Sig is added by, for example, an adder 150, and input as a monitor signal Vm to the controlling unit Ucnt. The controlling unit Ucnt compares the monitor signal Vm with, for example, a reference voltage Vref to control the driving unit Udrv such that the emitted light amount of the light-emitting element LE approaches a target value.

Figure 9:
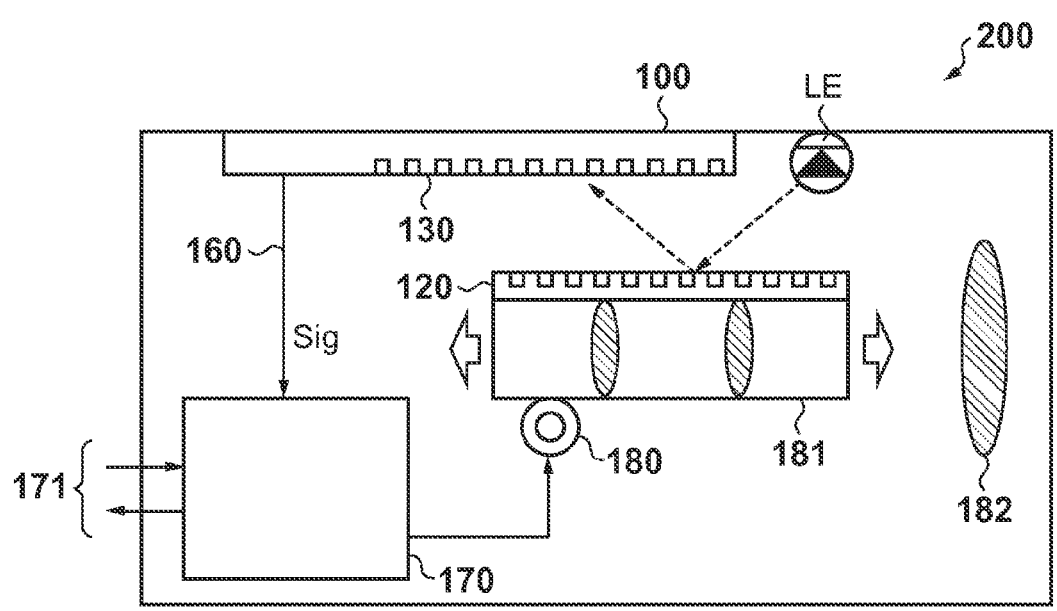
FIG. 9 is a schematic view for explaining a configuration example of a system for adjusting a lens position.

The signal Sig is also input, through a bus 160 or the like, to a system for adjusting the lens position of a camera exemplified in FIG. 9. FIG. 9 shows a lens unit 200 including the light-emitting element LE, the reflective optical scale 120, the line sensor 130, a lens 182, a movable lens barrel 181 including one or a plurality of lenses, a motor 180 for driving the lens barrel 181, and a calculation unit 170. The calculation unit 170 performs a calculation process on the signal Sig based on, for example, a control signal 171 concerning focus detection, thereby acquiring information of the lens position. Based on this information, the lens unit 200 can drive the lens barrel 181 by controlling the motor 180, and obtain an in-focus state by adjusting the lens position. The lens unit 200 may also be a unit detachable from the camera.

As described in "BACKGROUND OF THE INVENTION", it is possible to use the sequence in which the light-emitting element LE is set in the non-emitting state and then returned to the emitting state. An example is a case in which the signal Sig is read out when the light-emitting element LE is in the non-emitting state, in order to remove the offset component (generated by the amplifier circuit or the like) of the calculation unit 170. Another example is a case in which the optical encoder 100 is paused and then reactivated. In these sequences, the emitted light amount of the light-emitting element LE to be returned to the emitting state desirably becomes equal to the emitted light amount in the emitting state immediately preceding the non-emitting state within as short a time period as possible.

First Embodiment

A light-emitting element driving apparatus $I_1$ of the first embodiment will be explained with reference to FIGS. 1 and 2. As exemplified in FIG. 1, the light-emitting element driving apparatus $I_1$ includes a light-emitting element LE, driving unit Udrv, and controlling unit Ucnt. The driving unit Udrv has a control terminal cnt, and drives the light-emitting element LE in accordance with the potential of the control terminal cnt. The light-emitting element driving apparatus $I_1$ can also include a monitor unit Umon for monitoring the emitted light amount of the light-emitting element LE. The light-emitting element driving apparatus $I_1$ can further include a signal output unit Uout for outputting a signal Vout corresponding to a signal Sig output from the monitor unit Umon.

The signal output unit Uout can output the signal Vout as a first signal when the light-emitting element is in the non-emitting state, and output the signal Vout as a second signal when the light-emitting element has returned to the emitting state from the non-emitting state. As described previously, the calculation unit 170 outputs the difference between the first and second signals, and the lens unit 200 can adjust the lens position based on the result.

The controlling unit Ucnt compares, for example, a monitoring result (a monitor signal Vm) obtained by a monitor unit Umon with a reference voltage Vref. Based on this comparison result, the controlling unit Ucnt controls the driving unit Udrv so that the emitted light amount of the light-emitting element LE approaches a target value. This control is called auto power control/APC.

Figure 2:
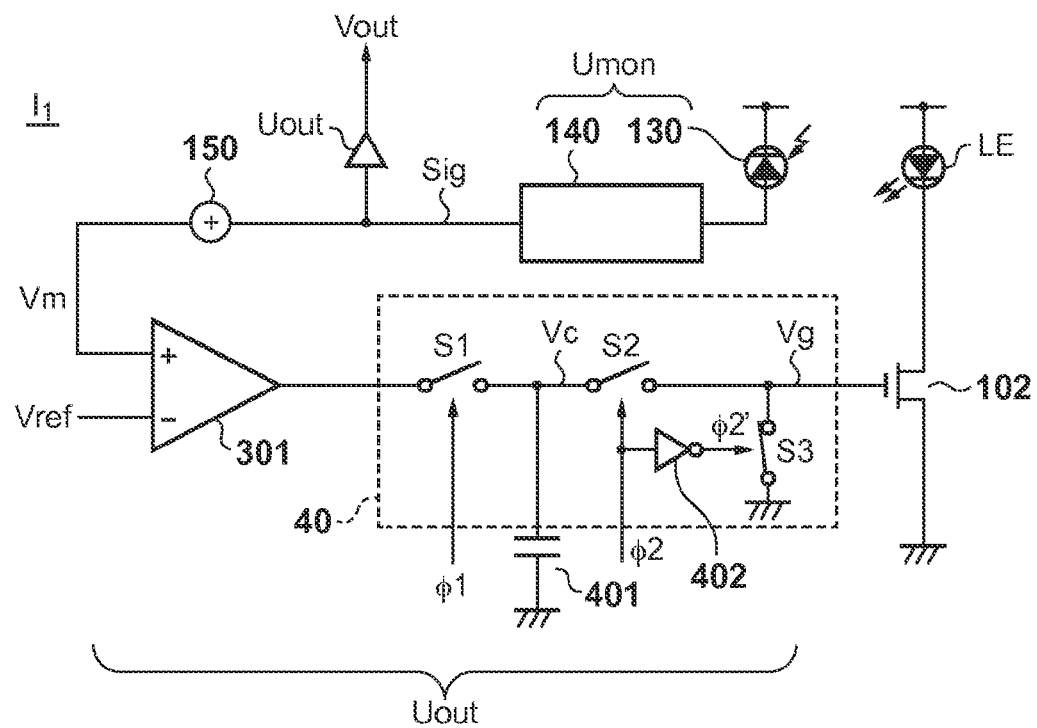
FIG. 2 is a view for explaining a circuit configuration example of a light-emitting element control apparatus according to the first embodiment.

FIG. 2 shows a practical configuration example of the light-emitting element driving apparatus $I_1$. An NMOS transistor 102, for example, can be used as the driving unit Udrv. The transistor 102 has a drain terminal connected to the cathode terminal of the light-emitting element LE, and an anode terminal connected to the power supply. The source terminal of the transistor 102 is grounded. The gate terminal of the transistor 102 corresponds to the control terminal cnt. Let Vg denote the gate voltage of the transistor 102 hereinafter.

Figure 8:
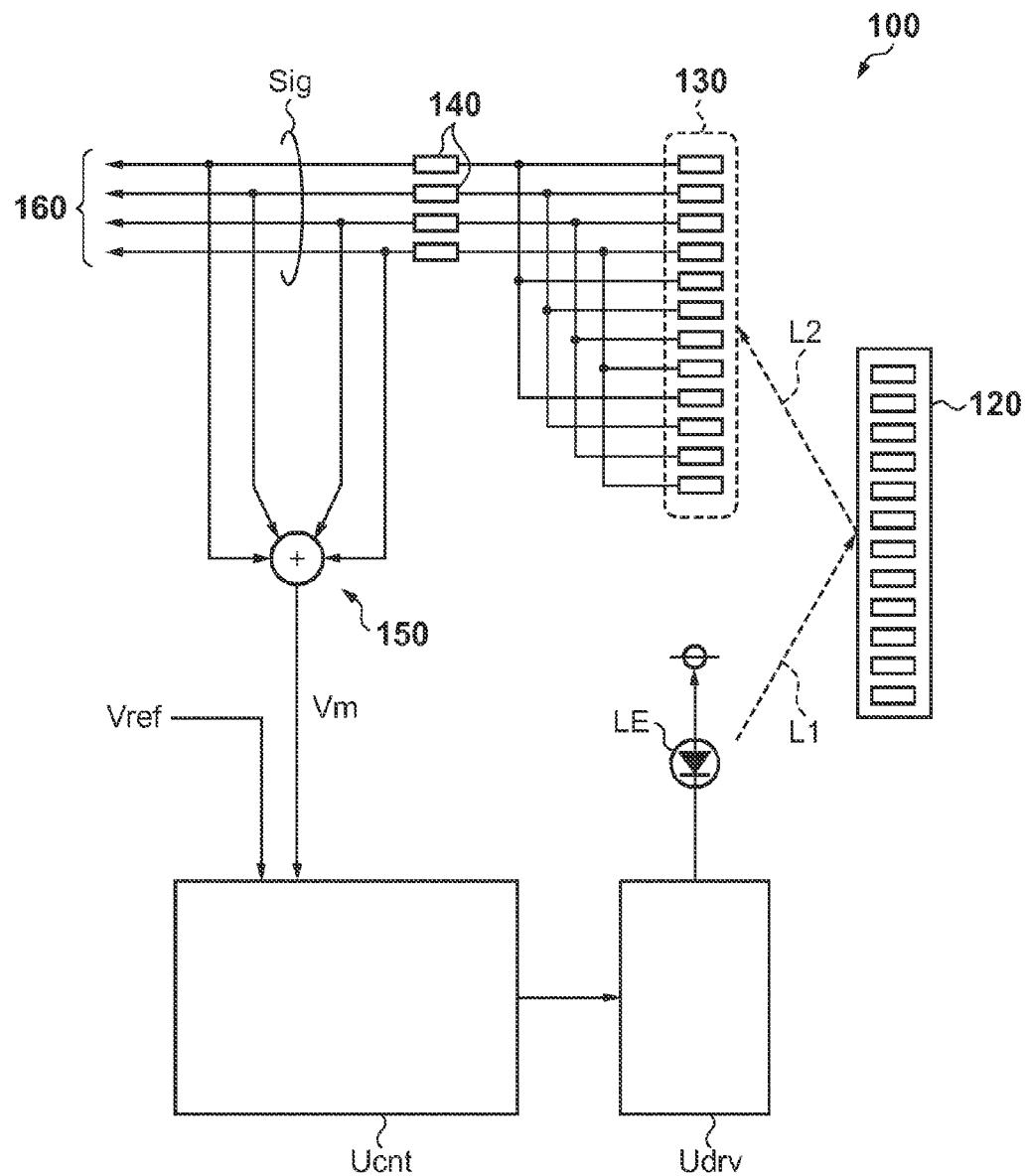
FIG. 8 is a schematic view for explaining a configuration example of an optical encoder.

As exemplified in FIG. 8, the monitor unit Umon can be formed by using a line sensor 130 and current-voltage conversion circuit 140. FIG. 2 shows one light-receiving element forming the line sensor 130. The current-voltage conversion circuit 140 converts an electric current generated in the line sensor 130 by light from the light-emitting element LE into a voltage, thereby obtaining the signal Sig. The signal output unit Uout outputs the voltage Vout in accordance with the signal Sig. The monitor voltage Vm is obtained by adding the signal Sig by the adder 150.

The controlling unit Ucnt can include a differential amplifier 301 and voltage holding unit 40. The monitor signal Vm can be input to the non-inverting input terminal (+) of the differential amplifier 301, and the reference voltage Vref can be input to the inverting input terminal (−) of the differential amplifier 301. The output terminal of the differential amplifier 301 can be connected to the voltage holding unit 40.

The voltage holding unit 40 can include a capacitor 401, an inverter 402, and switches S1, S2, and S3. The switch S1 is placed between the output terminal of the differential amplifier 301 and one terminal of the capacitor 401. The switch S2 is placed between one terminal of the capacitor 401 and the gate terminal of the transistor 102. The switch S3 is placed between the gate terminal of the transistor 102 and GND (ground level). The other terminal of the capacitor 401 is grounded. A signal $\Phi1$ is input to the switch S1, a signal $\Phi2$ is input to the switch S2, and a signal $\Phi2'$ obtained by inverting the signal $\Phi2$ by the inverter 402 is input to the switch S3. The voltage holding unit 40 can be arranged as described above.

When the light-emitting element LE is in the emitting state, the switches S1 and S2 are turned on and the switch S3 is turned off by setting the signals $\Phi1$ and $\Phi2$ at, for example, Hi level. If the emitted light amount of the light-emitting element LE is lower than the target value (Vm>Vref), the differential amplifier 301 charges the capacitor 401 via the switch S1, and a voltage Vc of the capacitor 401 rises. Consequently, the ON resistance of the transistor 102 decreases, and the amount of electric current flowing through the light-emitting element LE increases, that is, the emitted light amount of the light-emitting element LE increases.

On the other hand, if the emitted light amount of the light-emitting element LE is higher than the target value (Vm<Vref), the differential amplifier 301 discharges the capacitor 401 via the switch S1, and the voltage Vc drops. Consequently, the ON resistance of the transistor 102 increases, and the amount of electric current flowing through the light-emitting element LE decreases, that is, the emitted light amount of the light-emitting element LE decreases. Thus, the emitted light amount of the light-emitting element LE can be controlled so as to approach the target value.

Also, when setting the light-emitting element LE in the non-emitting state, the switches S1 and S2 are turned off and the switch S3 is turned on by setting the signals $\Phi1$ and $\Phi2$ at, for example, Low level. Accordingly, the gate voltage Vg of the gate terminal of the transistor 102 changes to Low level, so the transistor 102 is turned off and inactivated. As a consequence, no electric current flows through the light-emitting element LE, that is, the light-emitting element LE is set in the non-emitting state.

Figure 3:
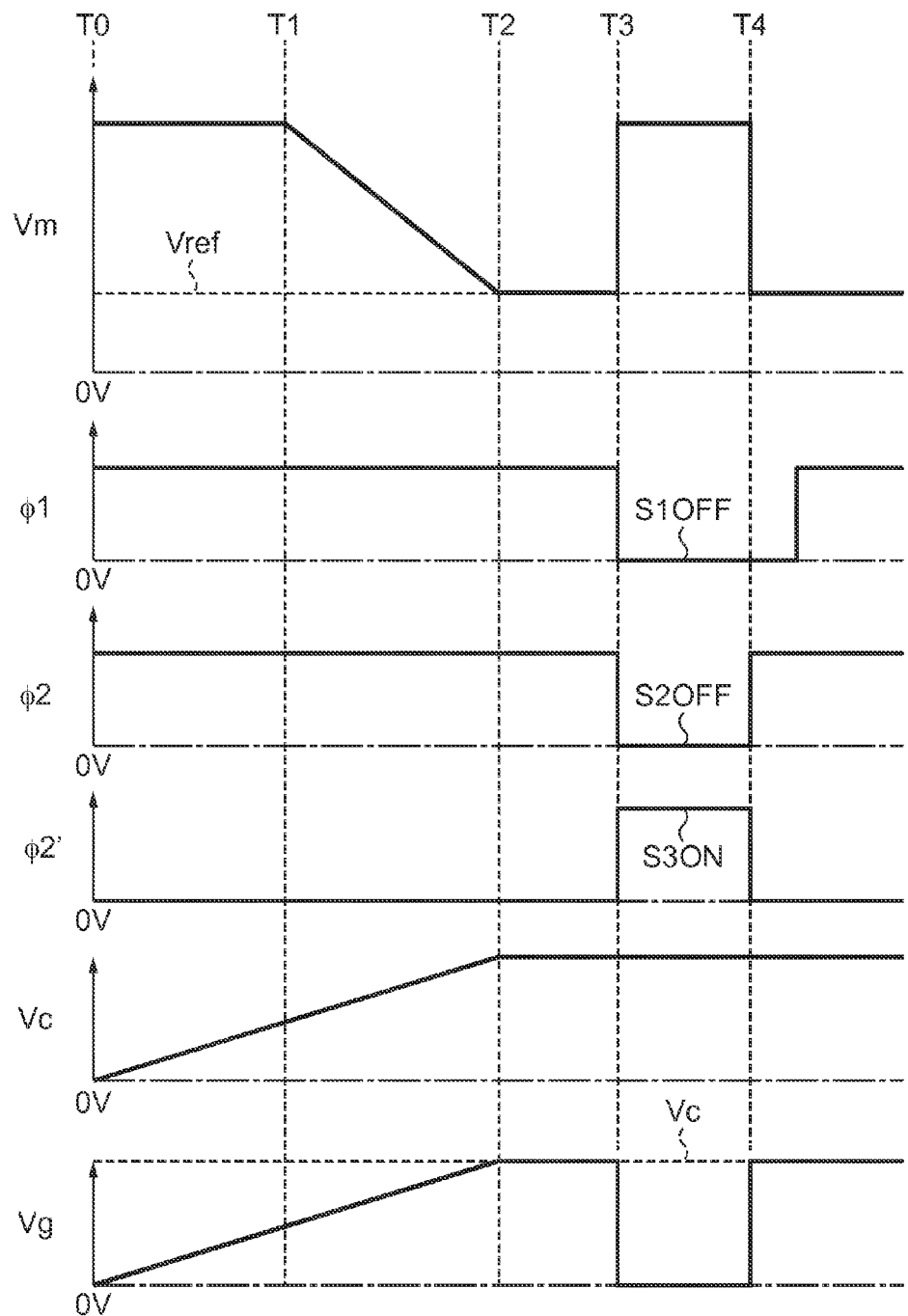
FIG. 3 is a view for explaining an example of an operation timing chart of the light-emitting element control apparatus according to the first embodiment.

FIG. 3 shows an example of an operation timing chart of the APC operation of the light-emitting element driving apparatus $I_1$. That is, FIG. 3 shows the monitor voltage Vm, the signals Φ1, Φ2, and Φ2', the voltage Vc of the capacitor 401, and the gate voltage Vg of the transistor 102.

At time T0 immediately after start, the signals Φ1 and Φ2 are at Hi level, and the signal Φ2' is at Low level. Also, the light-emitting element LE is in the non-emitting state. The monitor voltage Vm is almost equal to a power supply voltage Vcc, and higher than the reference voltage Vref. Therefore, the capacitor 401 is charged, and the voltage Vc rises.

When the voltage Vc exceeds a threshold voltage Vth of the transistor 102, the transistor 102 is turned on, and the light-emitting element LE is set in the emitting state. This time is regarded as time T1. After that, the voltage Vc rises until Vm=Vref, that is, until the emitted light amount of the light-emitting element LE reaches the target value. Since the switch S2 is ON, the gate voltage Vg rises in accordance with the voltage Vc.

After that, the monitor voltage Vm becomes equal to the reference voltage Vref, that is, the emitted light amount of the light-emitting element LE reaches the target value. This time is regarded as time T2.

At time T3, the signals Φ1 and Φ2 are set at Low level (the signal Φ2' changes to Hi level), thereby turning off the switches S1 and S2 and turning on the switch S3. Since the switch S3 is ON, the gate voltage Vg changes to Low level, and the light-emitting element LE is set in the non-emitting state. Since the switches S1 and S2 are OFF, electricity charged in the capacitor 401 is held. Thus, the voltage holding unit 40 holds the voltage Vc corresponding to the potential (gate voltage Vg) of the control terminal cnt.

While the light-emitting element LE is in the non-emitting state, the signal output unit Uout can output the signal Vout (the first signal). As described previously, the first signal can be used to, for example, remove the offset component of the calculation unit 170.

After that, at time T4, the signal Φ2 is returned to Hi level (the signal Φ2' changes to Low level), thereby turning on the switch S2 and turning off the switch S3. Although the gate voltage Vg is at Low level at time T3, the switch 2 is turned on at time T4. Accordingly, the voltage Vc of the capacitor 401 is transferred to the gate terminal of the transistor 102, so the gate voltage Vg can return to the voltage at times T2 and T3 within a short time period.

The switch S1 is preferably turned on after, for example, time T4 by returning the signal Φ1 to Hi level. Since the time at which the signal Φ1 is changed to Hi level is set after time T4 at which the signal Φ2 is changed to Hi level, the voltage Vc of the capacitor 401 does not fluctuate due to the output from the differential amplifier 301 before the voltage Vc is transferred to the gate terminal of the transistor 102. Accordingly, the gate voltage Vg can return to the previous voltage (the voltage at times T2 and T3) within a short time period.

The signal output unit Uout can output the signal Vout (the second signal) after the light-emitting element LE has returned to the emitting state. In examples shown FIGS. 8 and 9, the offset component of the calculation unit 170 is removed and the lens position is adjusted by using a difference signal between the second signal acquired after time T4 and the first signal acquired at times T3 and T4.

As described above, the emitted light amount of the light-emitting element LE (time T4) returning to the emitting state becomes equal to the emitted light amount in the emitting state (times T2 and T3) immediately preceding the non-emitting state, as shown in the sequence of FIG. 3. The above-described effect is effectively obtained by making the capacitance value of the capacitor 401 larger than the gate capacitance of the transistor 102. Also, the same effect can be obtained even when the ON resistance value of the switch S2 is designed to be small.

In the above-described control method, in the examples shown in FIGS. 8 and 9, after the optical encoder 100 starts operating and the temperature rises, the light-emitting element LE is set in the non-emitting state, and the first signal mainly containing the offset component is acquired. After that, the second signal necessary to detect the lens position is acquired by returning the light-emitting element LE to the previous emitting state within a short time period. That is, both the first and second signals are obtained after the apparatus temperature has risen. Therefore, this control method reduces the influence of a temperature difference on the adjustment of the lens position, when the first signal is acquired immediately after the apparatus is activated, that is, when the apparatus temperature is low, and the second signal is acquired when the operation of the apparatus has stabilized by APC, that is, when the apparatus temperature has risen. That is, this control method is advantageous in increasing the accuracy of the adjustment of the lens position.

Also, the capacitor 401 holds the voltage Vc corresponding to the individual characteristic variations of circuits and elements forming the light-emitting element driving apparatus $I_1$. As described earlier, the held voltage Vc is used when returning the light-emitting element LE to the emitting state, so the influence of the variations need not be taken into consideration, and this is advantageous in circuit design.

Second Embodiment

Figure 4:
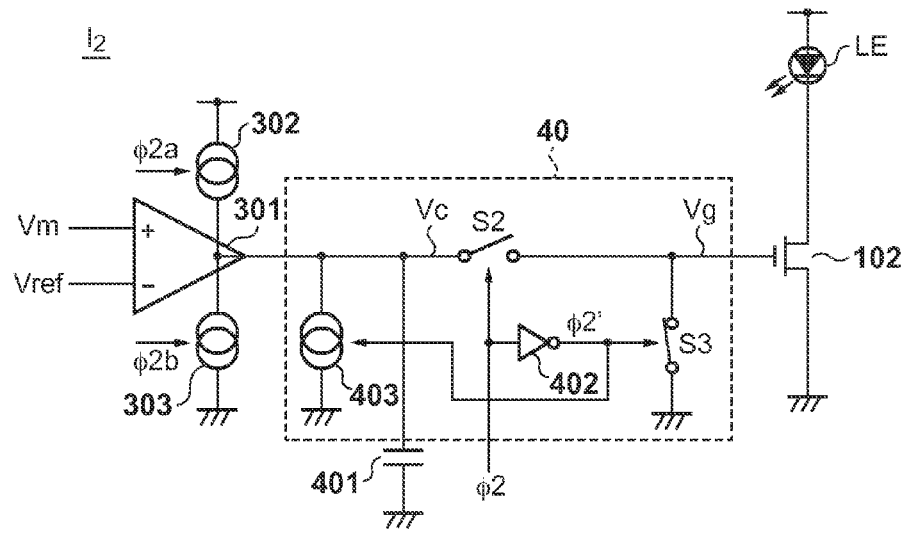
FIG. 4 is a view for explaining a circuit configuration example of a light-emitting element control apparatus according to the second embodiment.

A light-emitting element driving apparatus $I_2$ of the second embodiment will be explained with reference to FIG. 4. A main difference of this embodiment from the first embodiment in which the voltage Vc is held by using the switch S1 is that a voltage Vc of a capacitor 401 is held by using a current source. FIG. 4 shows a differential amplifier 301, a current source 302 placed between the output terminal of the differential amplifier 301 and a power line, and a current source 303 placed between this output terminal and GND. The light-emitting element driving apparatus $I_2$ can also include a current source 403 instead of the switch S1 of the first embodiment. A monitor unit Umon and signal output unit Uout are the same as those of the first embodiment, and hence are not shown in FIG. 4.

A control signal Φ2a, for example, switches a driving state and pause state of the current source 302. Also, a control signal Φ2b, for example, switches a driving state and pause state of the current source 303. Furthermore, a control signal Φ2', for example, switches a driving state and non-driving state (pause state) of the current source 403.

At times T0 to T3 in the sequence (FIG. 3) described in the first embodiment, the current source 403 is in the non-driving state, and the current sources 302 and 303 follow the APC operation described above. That is, when Vm>Vref, the capacitor 401 is charged by setting the current source 302 in the driving state, and the current source 303 in the non-driving state. On the other hand, when Vm<Vref, the capacitor 401 is discharged by setting the current source 302 in the non-driving state, and the current source 303 in the driving state.

At times T3 and T4, the light-emitting element LE is set in the non-emitting state, so Vm>Vref, and the current source 302 is set in the driving state. In this state, the current source 403 is set in the driving state in order to prevent the drop of the voltage held in the capacitor 401, that is, to prevent the discharge of electricity from the capacitor 401. When the current amounts of the current sources 403 and 302 are made equal, the capacitor 401 is neither charged nor discharged, so the voltage Vc can be maintained.

In the above embodiment, the same effect as that of the first embodiment is obtained by using the current source 302 as a first current source for charging the capacitor 401, and the current source 403 as a second current source for discharging the capacitor 401. More specifically, when the light-emitting element LE is in the emitting state, the capacitor is charged by setting the current source 302 in the driving state, and the current source 403 in the non-driving state. When the light-emitting element LE is in the non-emitting state, the voltage Vc charged in the capacitor is held by supplying equal electric currents to the current sources 302 and 403.

Figure 5:
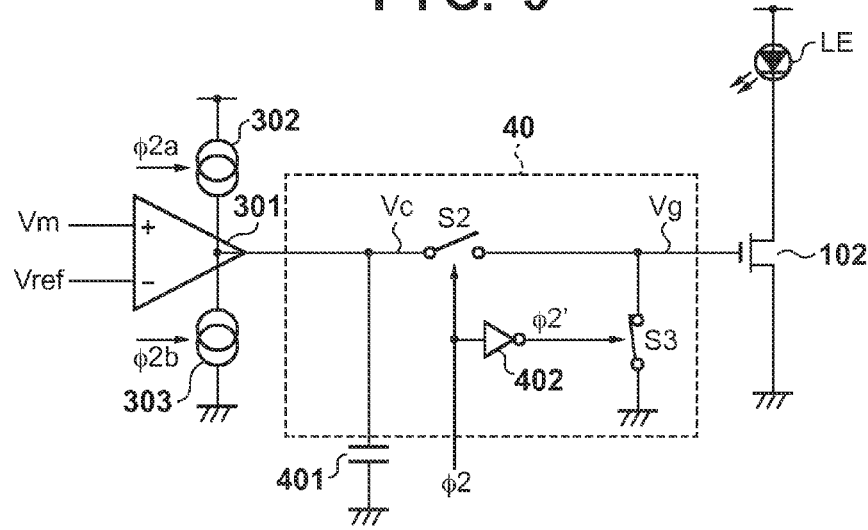
FIG. 5 is a view for explaining a circuit configuration example of a light-emitting element control apparatus according to another embodiment.

Although the arrangement in which the current source 302 is included in the differential amplifier 301 is exemplified in this embodiment, the capacitor 401 need only be charged, so the current source 302 may also be formed independently of the differential amplifier 301. Likewise, the current source 303 may also be formed independently of the differential amplifier 301. Furthermore, as shown in FIG. 5, the current source 403 may be omitted by causing the current source 303 to also function as the current source 403.

Third Embodiment

Figure 6:
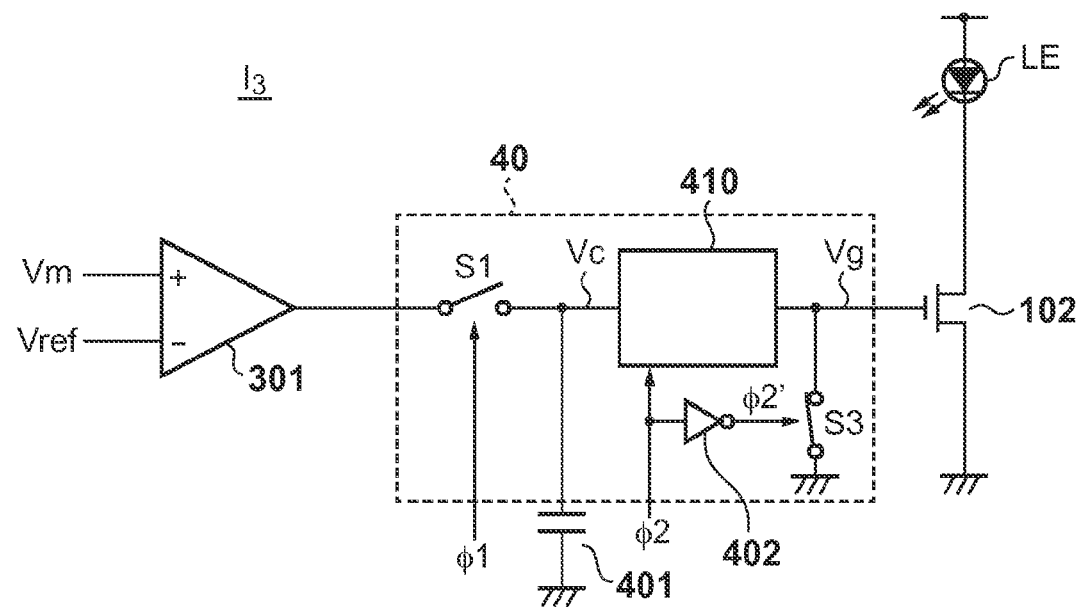
FIG. 6 is a view for explaining a circuit configuration example of a light-emitting element control apparatus according to the third embodiment.

A light-emitting element driving apparatus $I_3$ of the third embodiment will be explained with reference to FIG. 6. This embodiment differs from the first embodiment in that a voltage conversion circuit 410 (a second transfer unit) is used instead of the switch S2 (a first transfer unit). The voltage conversion circuit 410 can be controlled by control signals Φ1 and Φ2. The arrangement of this embodiment using the voltage conversion circuit 410 is advantageous when a voltage Vc is to be, for example, amplified or boosted without directly transferring the voltage Vc to the gate terminal.

At times T0 to T3 in the sequence (FIG. 3) described in the first embodiment, the voltage conversion circuit 410 outputs a voltage corresponding to the input voltage Vc, in response to the change of the control signal Φ2 to High level. At times T3 and T4, the voltage conversion circuit 410 outputs HiZ (high impedance) in response to the change of the control signal Φ2 to Low level. Therefore, the same effect as that of the first and second embodiments can be obtained in this embodiment as well.

Figure 7A:
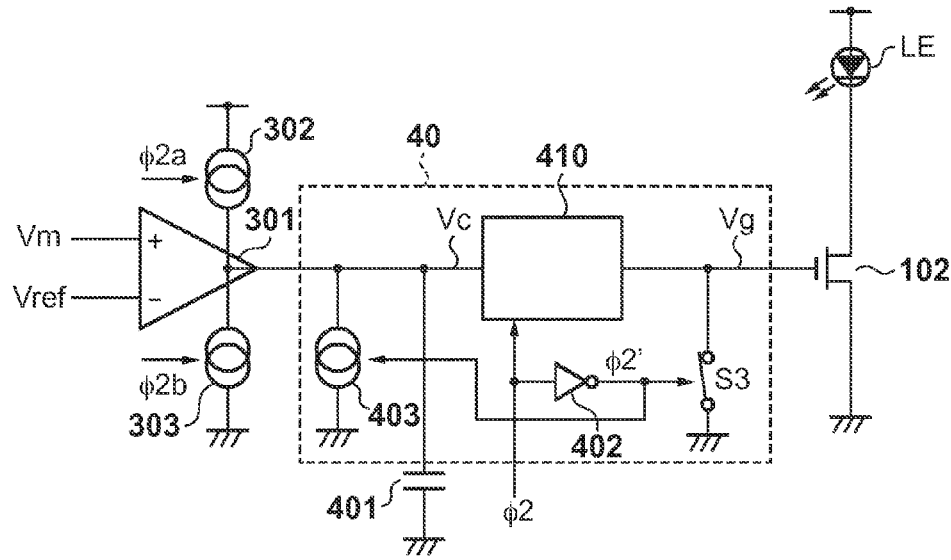
FIGS. 7A and 7B are views for explaining a circuit configuration example of a light-emitting element control apparatus according to another embodiment.
Figure 7B:
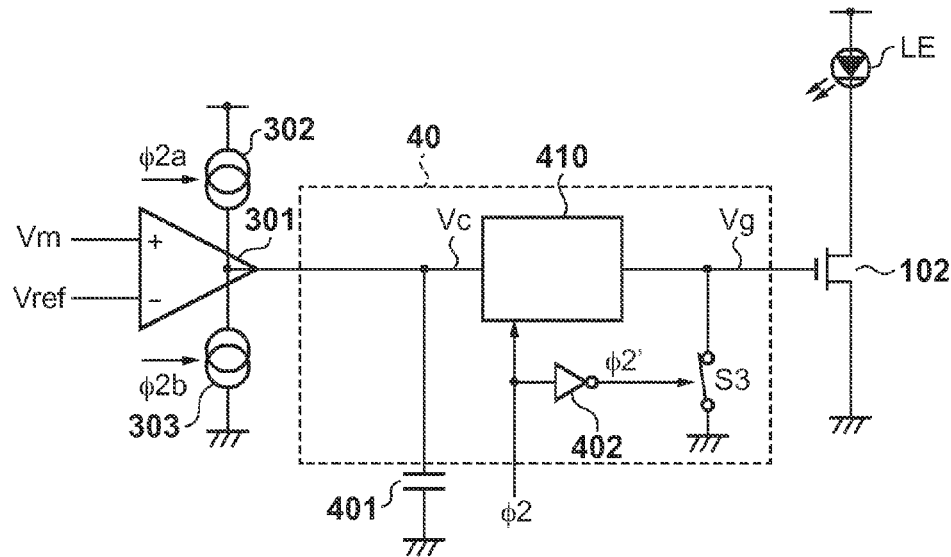

The three embodiments have been described above, but the present invention is not limited to these embodiments. That is, the present invention can properly be changed in accordance with objects, states, applications, functions, and other specifications, and can also be performed by another embodiment. For example, as shown in FIGS. 7A and 7B, it is also possible to form an arrangement by combining the first to third embodiments. For example, in each of the above-mentioned embodiments, the other terminal (the terminal opposite to the terminal of the path for connecting the output terminal of the differential amplifier 301 and the gate terminal of the transistor 102) of the capacitor 401 is grounded. However, the other terminal may also be connected to a predetermined reference potential. Also, for example, the NMOS transistor 102 is used as the driving unit Udrv in the above arrangement, but the driving unit Udrv need only be a module for driving the light-emitting element LE, and is not limited to this arrangement.

The light-emitting element driving apparatus and optical encoder included in a camera have been described above. However, the concept of a camera includes not only an apparatus whose main purpose is photographing, but also an apparatus (for example, a personal computer or portable terminal) including a photographing function as an auxiliary function. Furthermore, a camera can include an optical encoder using the light-emitting element driving apparatus disclosed in the above-mentioned embodiments, a solid-state image sensor, and a processing unit for processing an output signal from the solid-state image sensor. This processing unit, for example, can include an A/D converter and a processor for processing output digital data from the A/D converter. The processing unit can process information of the lens position, and appropriate changes can be made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-043420, filed Mar. 5, 2013, which is hereby incorporated by reference herein in its entirety.

What is claimed is:

1. A light-emitting element driving apparatus comprising:
a light-emitting element;
a driving unit including a control terminal and configured to drive the light-emitting element in accordance with a potential of the control terminal; and
a controlling unit including a voltage holding unit,
wherein the controlling unit
controls the potential of the control terminal such that an emitted light amount approaches a target value, and causes the voltage holding unit to hold a voltage corresponding to the potential of the control terminal, when the light-emitting element is in an emitting state,
controls the potential of the control terminal to inactivate the driving unit, when setting the light-emitting element in a non-emitting state, and
controls the potential of the control terminal by using the voltage held in the voltage holding unit, when setting the light-emitting element in the emitting state from the non-emitting state.

2. The apparatus according to claim 1, further comprising:
a monitor unit configured to monitor the emitted light amount of the light-emitting element; and
a signal output unit configured to output a signal corresponding to a monitoring result from the monitor unit,
wherein the signal output unit outputs the signal as a first signal when the light-emitting element is in the non-emitting state, and outputs the signal as a second signal when the light-emitting element has returned to the emitting state from the non-emitting state.

3. The apparatus according to claim 2, further comprising a calculation unit configured to output a difference between the first signal and the second signal.

4. The apparatus according to claim 1, wherein the voltage holding unit further includes one of a first transfer unit configured to transfer the voltage held in the voltage holding unit to the control terminal, and a second transfer unit configured to convert the voltage held in the voltage holding unit into a different voltage, and transfer the different voltage to the control terminal.

5. The apparatus according to claim 1, wherein
the voltage holding unit includes a capacitor, and a switch connected to the capacitor, and
the controlling unit charges the capacitor by turning on the switch when the light-emitting element is in the emitting state, and holds a voltage charged to the capacitor by turning off the switch when the light-emitting element is in the non-emitting state.

6. The apparatus according to claim 1, wherein
the voltage holding unit includes a capacitor, a first current source configured to charge the capacitor, and a second current source configured to discharge the capacitor, and
the controlling unit charges the capacitor by setting the first current source in a driving state and the second current source in a pause state when the light-emitting element is in the emitting state, and holds a voltage charged to the capacitor by supplying equal electric currents to the first current source and the second current source when the light-emitting element is in the non-emitting state.

7. An optical encoder comprising:
a light-emitting element driving apparatus cited in claim 1; and
a reflective optical scale configured to reflect emitted light from the light-emitting element,
wherein information of a position of the reflective optical scale is acquired based on reflected light from the reflective optical scale.

8. A lens unit comprising:
an optical encoder cited in claim 7; and
a plurality of lenses.

9. A camera comprising a lens unit cited in claim 8, wherein positions of the plurality of lenses are adjusted in accordance with an output from the optical encoder.

10. A method for controlling a light-emitting element driving apparatus including a light-emitting element, a driving unit including a control terminal and configured to drive the light-emitting element in accordance with a potential of the control terminal, and a voltage holding unit, comprising:
controlling a potential of the control terminal such that an emitted light amount approaches a target value, and holding a voltage corresponding to the potential of the control terminal in the voltage holding unit, when the light-emitting element is in an emitting state;
controlling the potential of the control terminal to inactivate the driving unit, when setting the light-emitting element in a non-emitting state; and
controlling the potential of the control terminal such that the light-emitting element emits light with an emitted light amount in an emitting state immediately before the light-emitting element is set in the non-emitting state, by using the voltage held in the voltage holding unit, when returning the light-emitting element to the emitting state from the non-emitting state.

* * * * *